United States Patent [19]

Inaba et al.

[11] Patent Number: 5,169,211
[45] Date of Patent: Dec. 8, 1992

[54] VEHICLE SEAT ASSEMBLY

[75] Inventors: Yasuhisa Inaba, Handa; Masaki Okada, Yokkaichi, both of Japan

[73] Assignee: Aisin Seiki Kabushiki Kaisha, Kariya, Japan

[21] Appl. No.: 671,378

[22] Filed: Mar. 7, 1991

[30] Foreign Application Priority Data

Mar. 12, 1990 [JP] Japan .................. 2-62347

[51] Int. Cl.$^5$ .............................. A47C 7/00
[52] U.S. Cl. ................... 297/443; 297/440; 297/442; 297/444; 297/454
[58] Field of Search ............ 297/440, 442–444, 297/454; 403/320, 321, 325, 327

[56] References Cited

U.S. PATENT DOCUMENTS

| | | | |
|---|---|---|---|
| 3,989,298 | 11/1976 | Cycowicz et al. | 297/443 X |
| 4,082,355 | 4/1978 | Knabusch et al. | 297/443 |
| 4,395,071 | 7/1983 | Laird | 297/440 |
| 4,844,541 | 7/1989 | Laird | 297/440 X |
| 4,850,646 | 7/1989 | Wieland | 297/444 |
| 4,890,888 | 1/1990 | Kostin | 297/443 |
| 5,005,908 | 4/1991 | Young | 297/443 |

FOREIGN PATENT DOCUMENTS

58-195508 11/1983 Japan .

Primary Examiner—Kenneth J. Dorner
Assistant Examiner—Milton Nelson, Jr.
Attorney, Agent, or Firm—Finnegan, Henderson, Farabow, Garrett & Dunner

[57] ABSTRACT

A seat for vehicles having a seat cushion and a seatback includes a seat cushion bracket mounted on both sides of the seat cushion, a seatback bracket mounted on both sides of the seatback, a lever rotatably pivoted on the seatback bracket, a cam member slidably supported on the seatback bracket and operatively connected to the lever, a locking groove formed on the seat cushion bracket and fixedly connectable with the cam member, and urging means interposed between the seatback bracket and the lever and always urging the lever so as to fixedly connect the cam member and locking groove.

9 Claims, 8 Drawing Sheets

VEHICLE SEAT ASSEMBLY

BACKGROUND OF THE INVENTION

1. Field of the Invention

The present invention relates to a seat for vehicles and, in particular, to an improved connecting structure between a seat cushion and a seatback in a vehicle seat.

2. Description of the Related Art

Japanese Patent Laid Open Publication No. 58 (1983)-195508 discloses a type of seat for vehicles in which assembly of a seat cushion and a seat back is facilitated by interfitting brackets on the respective seat cushion and seat back. The brackets are provided with a self-engaging device for securing the interfitted brackets when the seat back is assembled with the seat cushion. The seat cushion bracket, which is fixed to the seat cushion, includes a control edge engagable by a cam surface on a hook member of double arms mounted on the seatback bracket fixed to the seatback. Upon assembling the seatback with the seat cushion, the seat cushion bracket is connected to a curved piece formed on the seatback bracket along a stop member which is mounted on the seatback bracket. As a result, the control edge and the cam surface on the hook member are engaged and the engagement maintained by the force of a spring interposed between the hook portion and the seatback bracket. Thus, the seatback bracket is supported by the seat cushion bracket simply by the connection of the respective brackets, thereby to attain the assembly of the seatback and the seat cushion.

However, the support of the seatback on the seat cushion is effected by the surface contact between the cam surface and the control edge in the above-mentioned seat for vehicles, so that dimensional tolerances in the cam surface and the control edge affect the support position and the support strength of the seatback. As a result, variations occur in the support position of the seatback and failure in the support of the seatback can occur in an extreme case. Therefore, high accuracy in the dimensions of the cam surface and the control edge is required, giving rise to increased machining time and manufacturing costs.

SUMMARY OF THE INVENTION

It is therefore a primary object of the present invention to provide a seat assembly structure for vehicles without the aforementioned drawback.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention is directed to a seat for vehicles having a seat cushion and a seat back and comprising a seat cushion bracket mounted on both sides of the seat cushion, a seatback bracket mounted on both sides of the seat back, a lever pivoted on the seatback bracket, a cam member slidably supported on the seatback bracket and operatively engagable by the lever, a locking recess formed on the seat cushion bracket and engagable by the cam member, and biasing means operative between the seatback bracket and the lever to urge the lever in a direction to retain the cam member in fixing engagement with the locking recess.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
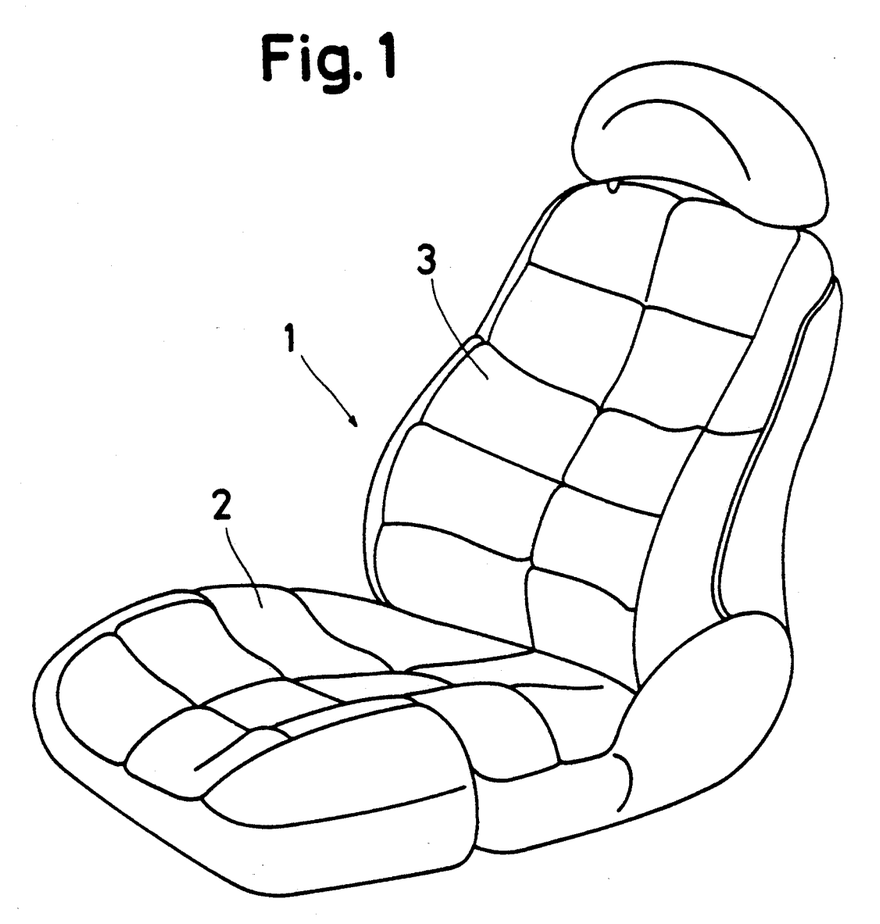
FIGS. 1 and 2 are perspective views of a seat for vehicles in accordance with the present invention.
Figure 2:
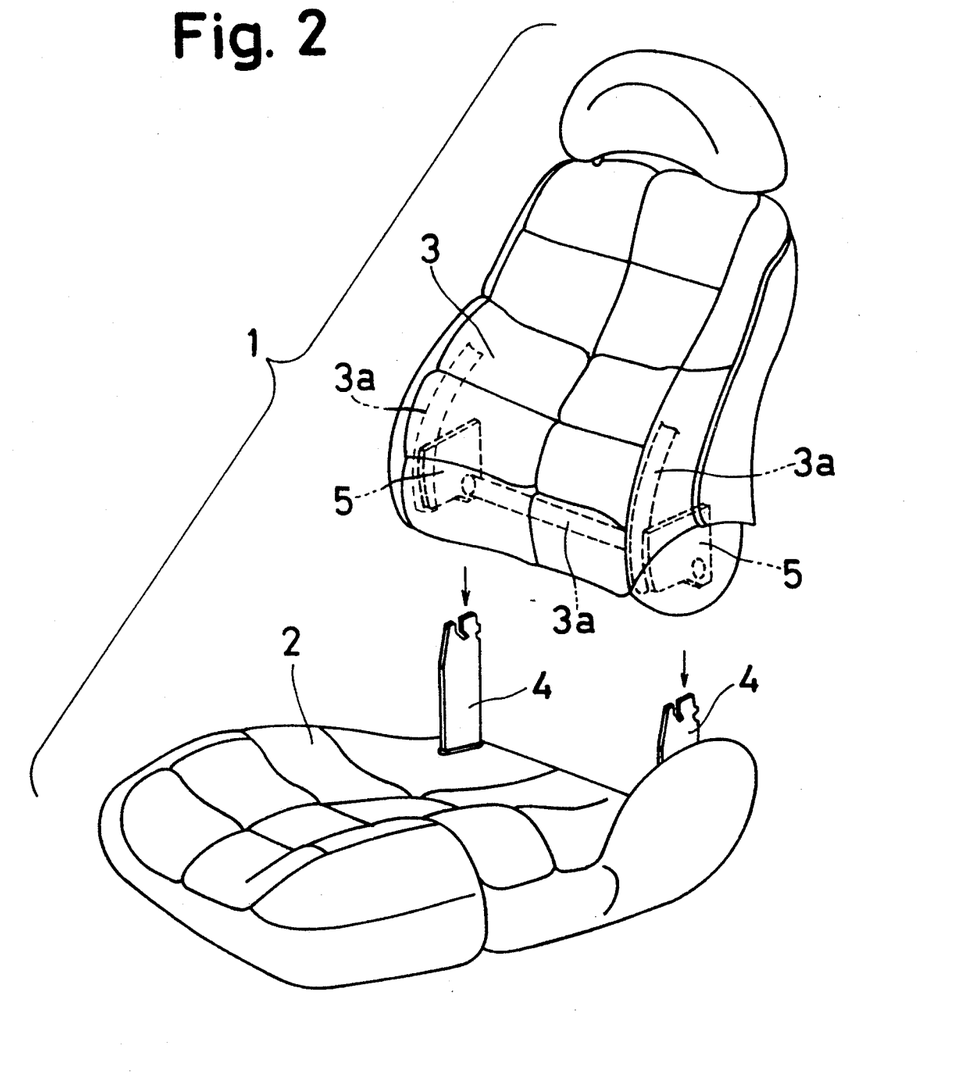

In FIGS. 1 and 2 of the drawings, which show a preferred embodiment according to the present invention, the reference numeral 1 designates a seat including a seat cushion 2 and a seatback 3. As shown clearly in FIG. 2, a seat cushion bracket 4 is provided on each of both sides of the seat cushion 2 and seatback brackets 5 are fixedly mounted to both sides of a seatback frame 3a extending about the seatback 3.

Figure 3A:
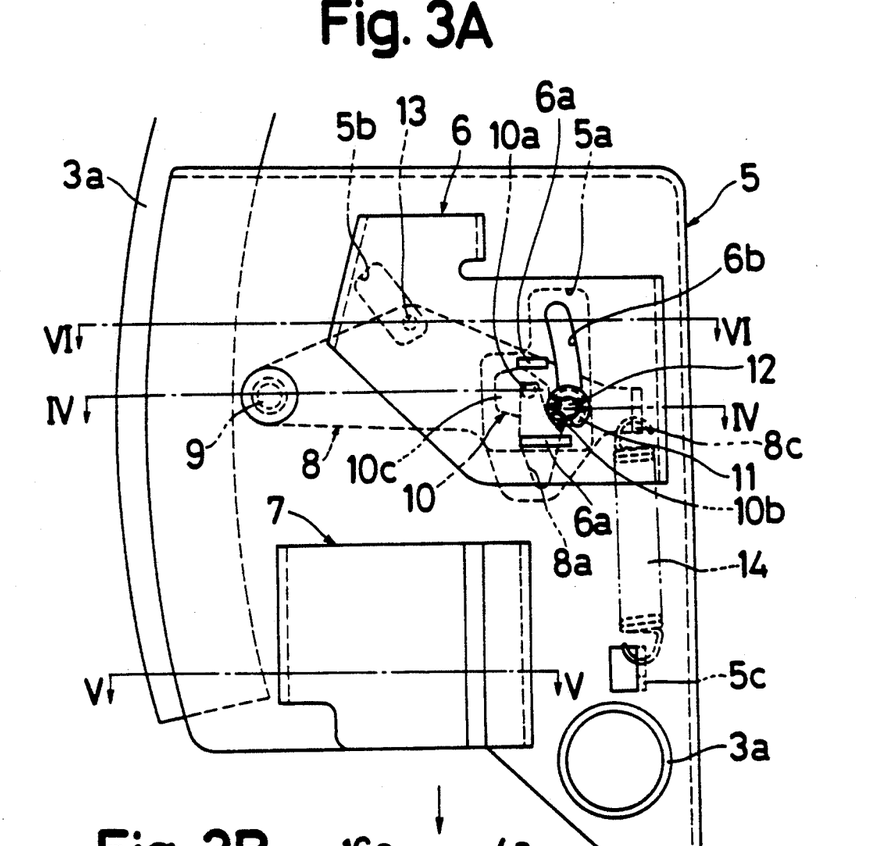
FIG. 3A is an enlarged side elevation of a support mechanism in the seatback of FIGS. 1 and 2.

As shown in FIGS. 3A–6, guide members 6 and 7 are fixed to a side surface of the seatback bracket 5 for receiving the seat cushion bracket 4. A lever 8 is pivoted on a rear surface of the seatback bracket 5 by a pivot pin 9. A cam member 10 is interposed between the guide member 6 and the lever 8 through a relatively large opening 5a in the seatback bracket 5. member 10 is guided by a pair of projecting ledge-like portions 6a formed on the guide member 6 (FIGS. 3 and 6) in a manner so that up and down movement of the cam member 10 is restricted, whereas left and right sliding movement of the cam member 10, as presented in FIG. 3A, is unrestricted by fixed stops. Furthermore, the cam member 10 is provided with a projection 10a which extends into an elongated wedge-shaped hole 8a (FIGS. 4 and 7) formed on the lever 8.

A follower pin 12, slidable in an elongated arcuate hole or slot 6b, which is concentric with the pivot pin 9 and formed in the guide member 6, is mounted on the lever 8 and extends through the opening 5a and slot 6b to a C-ring 11. The follower pin 12 is engageable with a ramp surface 10b (FIGS. 3A and 7) of the cam member 10. A lifting pin 13 is provided on the lever 8 and is projected between the seatback bracket 5 and the guide member 6 through a relatively small, generally rectangular opening 5b formed on the seatback bracket 5. A tensioned coil spring 14 is interposed between the seatback bracket 5 and the lever 8, one end thereof being engaged with a lug 5c on the seatback bracket 5 and other end thereof being engaged with lug 8c formed on the lever 8. The spring 14 always urges the lever 8 in the clockwise direction in FIG. 3A, that is to say, in a direction by which the ramp surface 10b of the cam member 10 and the follower pin 12 are engaged.

Figure 3B:
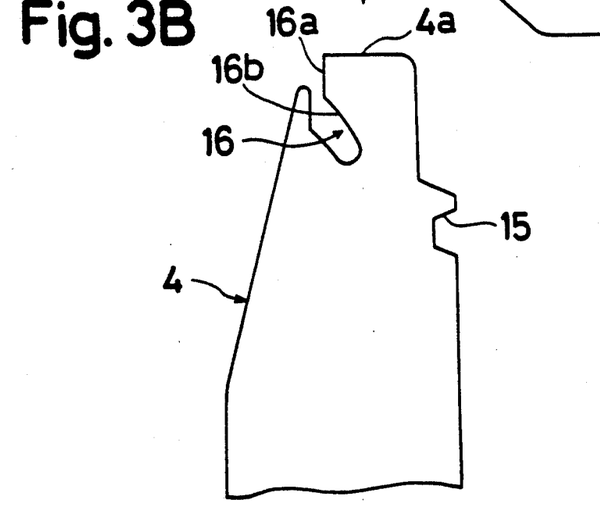
FIG. 3B is an enlarged fragmentary elevation of a seat cushion bracket in position to be received in the support mechanism of FIG. 3A.
Figure 4:
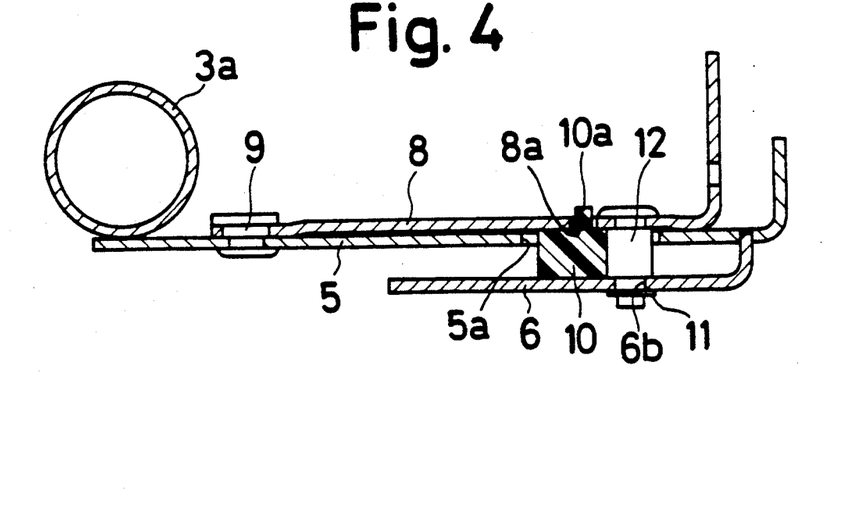
FIG. 4 is a cross-sectional view, taken along the line IV—IV in FIG. 3A.
Figure 5:
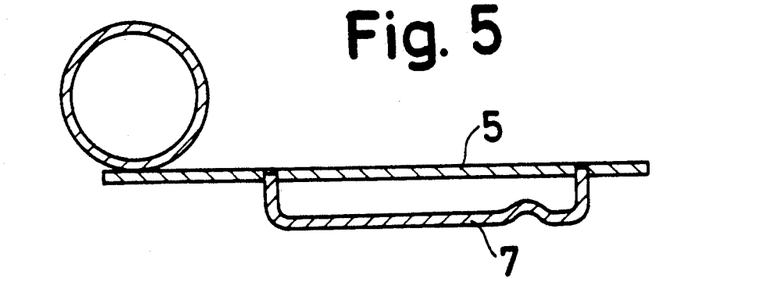
FIG. 5 is a view similar to FIG. 4, however, taken along the line V—V in FIG. 3A.
Figure 6:
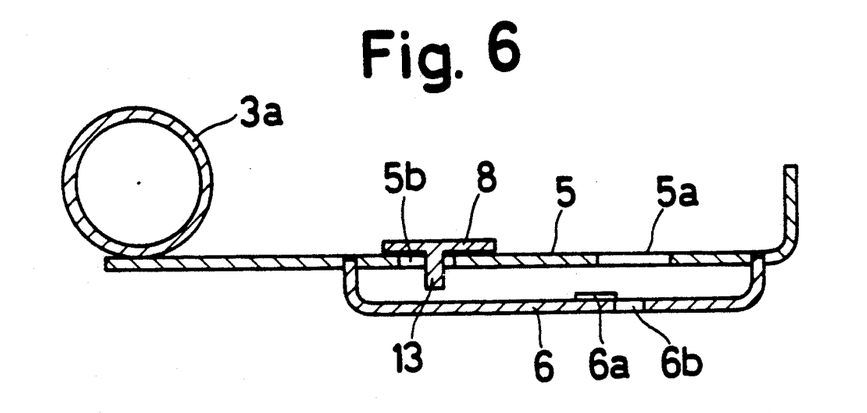
FIG. 6 is a view similar to FIG. 4, however, taken along the line VI—VI in FIG. 3A.

The seat cushion bracket 4, as shown in FIG. 3B, includes a tapered locking recess 15 adapted to receive a similarly tapered bolt portion 10c of the cam member 10, a groove 16a parallel to the insertion direction of the seat cushion bracket 4 to the seatback bracket 5 and engageable with the lifting pin 13, and an engaging groove 16 having an edge 16b inclined to the above-mentioned insertion direction.

As described hereinafter, the seatback 3 is advanced from a position in which it is separated from the seat cushion 1, as shown in FIG. 2, to an assembled position with the seat cushion as shown in FIG. 1.

Figure 7:
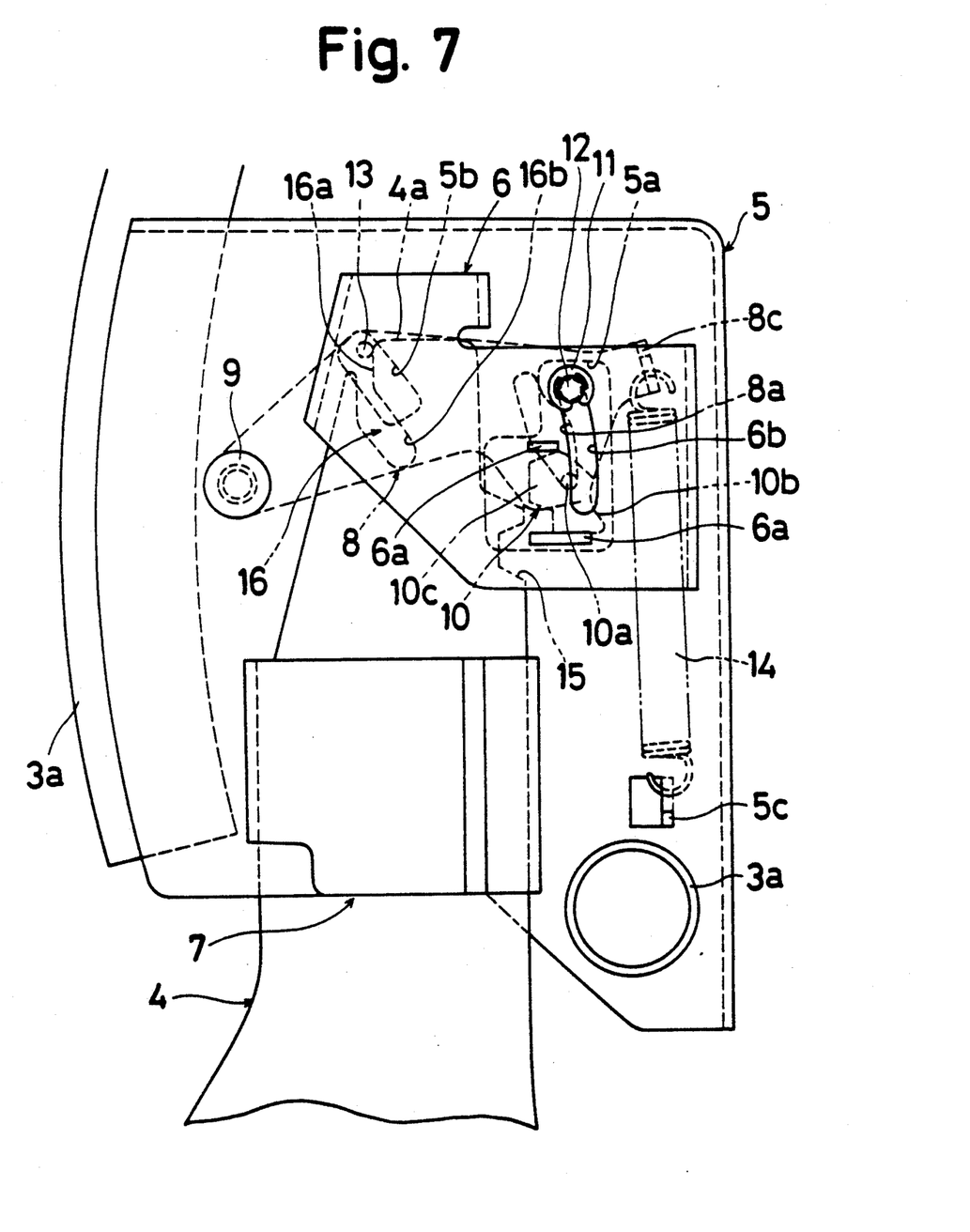
FIG. 7 is a view similar to the combined illustrations of FIGS. 3A and 3B, showing an assembly of a seatback to a seat cushion.

When the seatback bracket 5 is assembled with the seat cushion bracket 4, the latter bracket becomes inserted between the seatback bracket 5 and the guide members 6 and 7. During such insertion, a top edge 4a (FIG. 3B) of the seat cushion bracket 4 contacts the lifting pin 13 to cause the lever 8 to be pivoted in a counter-clockwise direction against the force of the spring 14 as illustrated in FIG. 3A. The follower pin 12 is slid along the elongated arcuate slot 6b and the engagement of the follower pin with the ramp surface 10b on the cam member 10 is released by movement of the lever 8 to the position shown in FIG. 7. The cam member 10 becomes slidable in the rightward direction as shown in FIG. 3A, and is thus slid to the right along the projecting portion 6a by an inclined edge of the elongated hole 8a in the lever 8 engaging with the projection 10a of the cam member 10 in FIG. 3A. At the same time, the lifting pin 13 on the lever 8 is released from the top edge 4a of the seat cushion bracket 4 and is received in the groove 16a. The lever 8 is then rotated in the clockwise direction by the force of the spring 14, as shown in FIG. 7, toward the position shown in FIG. 3A. However, the lifting pin 13 on the lever 8 contacts with a side edge of the groove 16a to restrict such rotation of the lever 8. As a result, the cam member 10 remains in the position shown in FIG. 7 because the follower pin 12 remains elevated in the arcuate slot 6b.

When the seat cushion bracket 4 is fully received between the seatback bracket 5 and guide members 6 and 7, the lifting pin 13 on the lever 8 is released from the groove 16a into the groove 16. The lever 8 pivots in a clockwise direction in FIG. 7 due to the shape of the edge 16b and the force of the spring 14. The cam member 10, previously moved to the right position in FIG. 7 by the projecting portion 10a engaging an edge of the elongated hole 8a in the lever 8, is now moved to the left by another edge of the hole 8a so that the bolt portion 10c on the cam member 10 moves into the locking recess 15 of the seat cushion bracket 4. In addition, the follower pin 12 moves down along the elongated hole 6b to engage the ramp surface 10b of the cam member 10 and retain the cam member 10 against further movement. The seatback bracket 5 is thus supported by the seat cushion bracket 4, and the assembly of the seatback 3 to the seat cushion 2 is accomplished.

Figure 8:
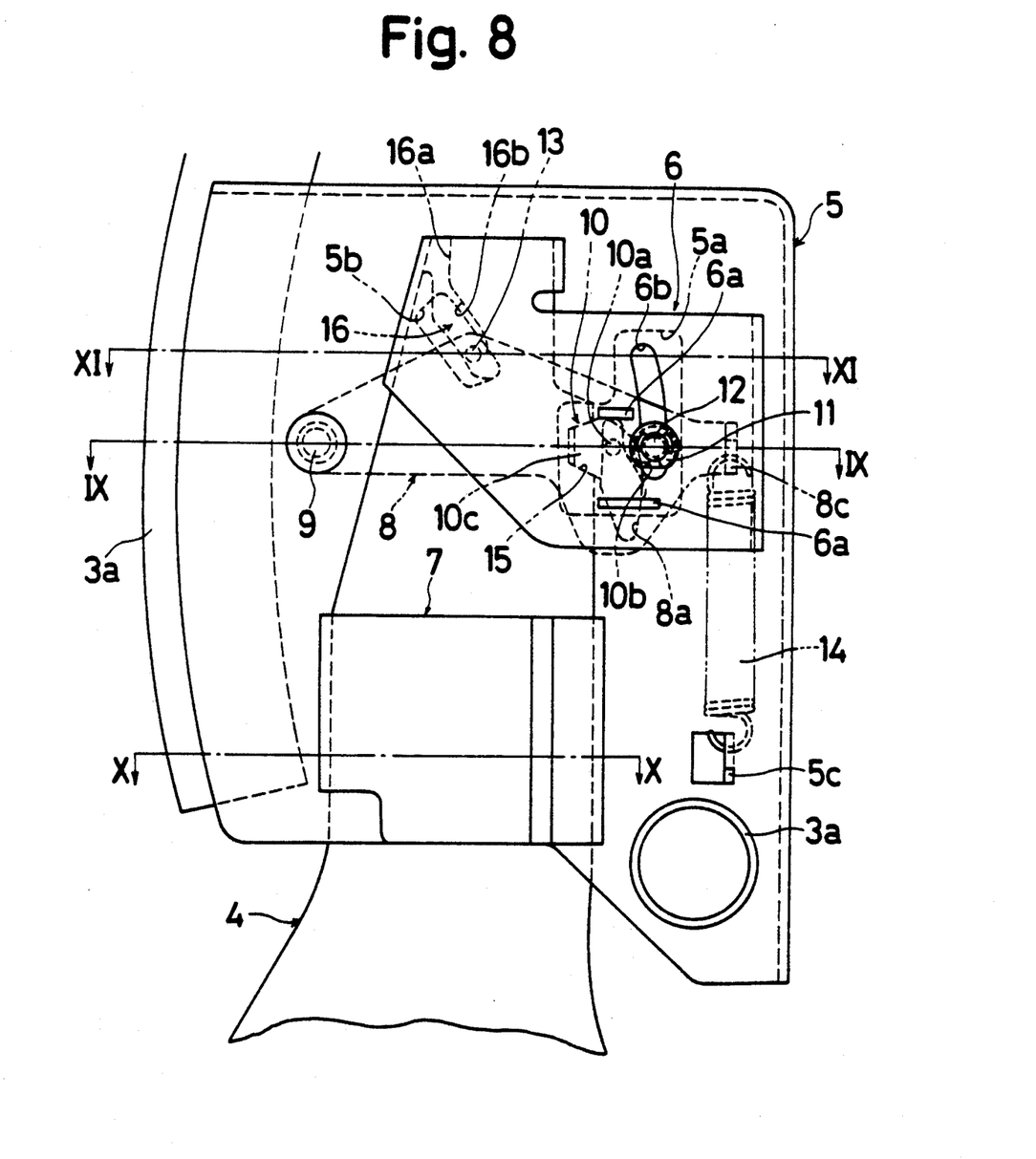
FIG. 8 is a view similar to FIG. 7, showing a completed assembly of the seatback.
Figure 9:
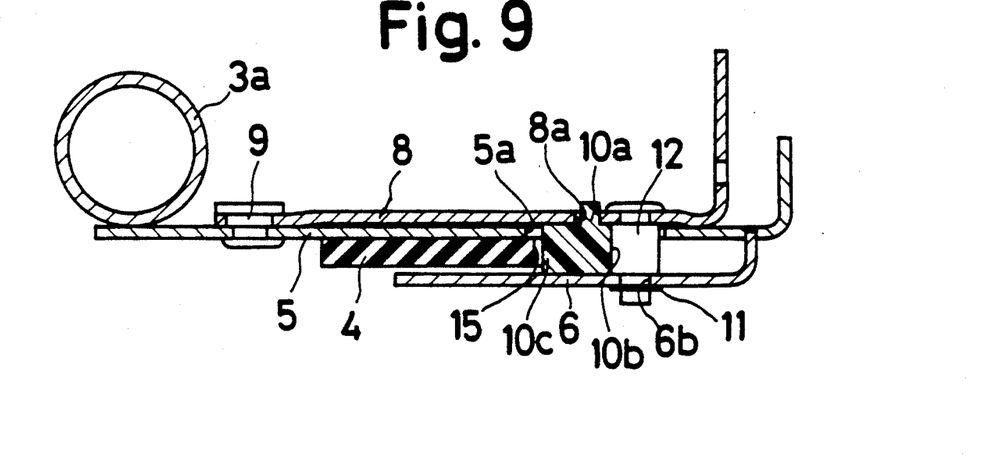
FIG. 9 is a cross-sectional view taken along the line IX—IX in FIG. 8.
Figure 10:
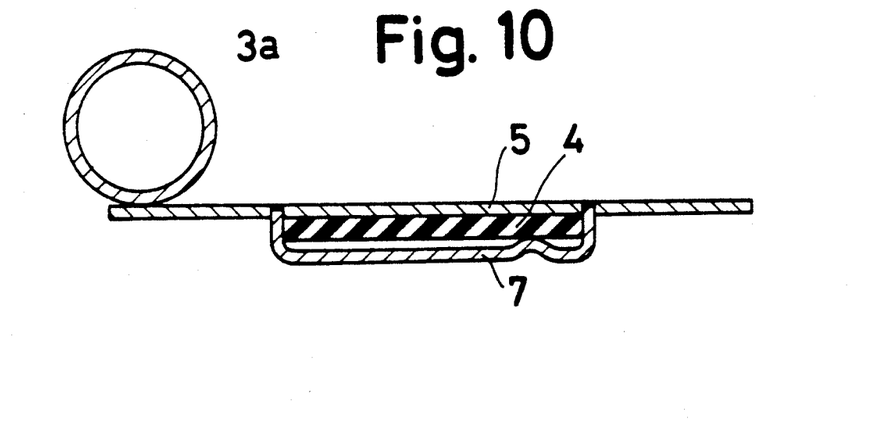
FIG. 10 is a cross-sectional view taken along the line X—X in FIG. 8.
Figure 11:
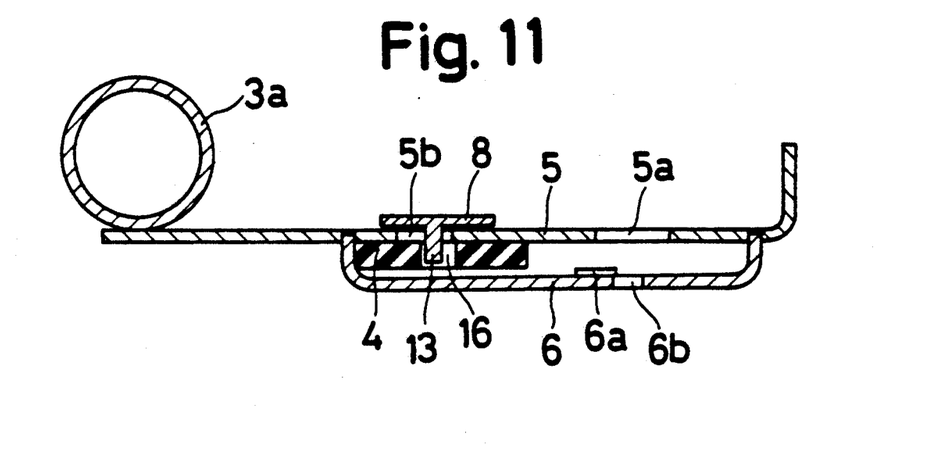
FIG. 11 is a cross-sectional view taken along the line XI—XI in FIG. 8.

In FIGS. 8-11, the described components on the respective brackets 4 and 5 are shown in the fully assembled condition. Thus, the tapered bolt portion 10c of the cam member 10 is shown in FIG. 8 to be firmly engaged in the correspondingly tapered lock recess 15 of the seat cushion bracket 4 by wedging action of the follower pin 12 on the lever 8, pulled by the spring 14, against the ramp surface 10b of the cam member 10. Also, and as shown in FIG. 9, the projection 10a on the cam member 10 is free of the edges of the hole 8a in the lever 8. Finally, as shown in FIGS. 10 and 11, the force urging the cam member 10 in the direction of the lock recess 15 on one edge of the seat cushion bracket 4 is opposed by engagement of the opposite side of the bracket 4 with the guide members 6 and 7 fixed to the seatback bracket 5.

As above-mentioned, the seatback 3 can be assembled to the seat cushion 2 simply by inserting the seatback bracket 5 over the seat cushion bracket 4. Consequently, full assembly of the seatback 3 and the seat cushion 2 can be attained after both have been completely finished separately, thereby assuring the quality of each component of the seat 1. Since the seatback bracket 5 and the seat cushion bracket 4 are located entirely within the seatback 3 in the assembling procedure, it is not required that the seatback bracket 5 and the seat cushion bracket 4 be covered by other material. Further, the seatback 3 is supported on the seat cushion 2 by the fixed connection of the cam member 10 and the locking recess 15, so the seatback 3 and the seat cushion 2 can be supported in a predetermined position simply and rigidly without influence by tolerance variations in the locking recess 15 and the cam member 10. Furthermore, since the cam member 10 is maintained in its locking state by the engagement of the ramp surface 10b, the follower pin 12, and the urging force of the spring 14, the seatback 3 is prevented from movement with respect to the seat cushion 2.

Figure 12:
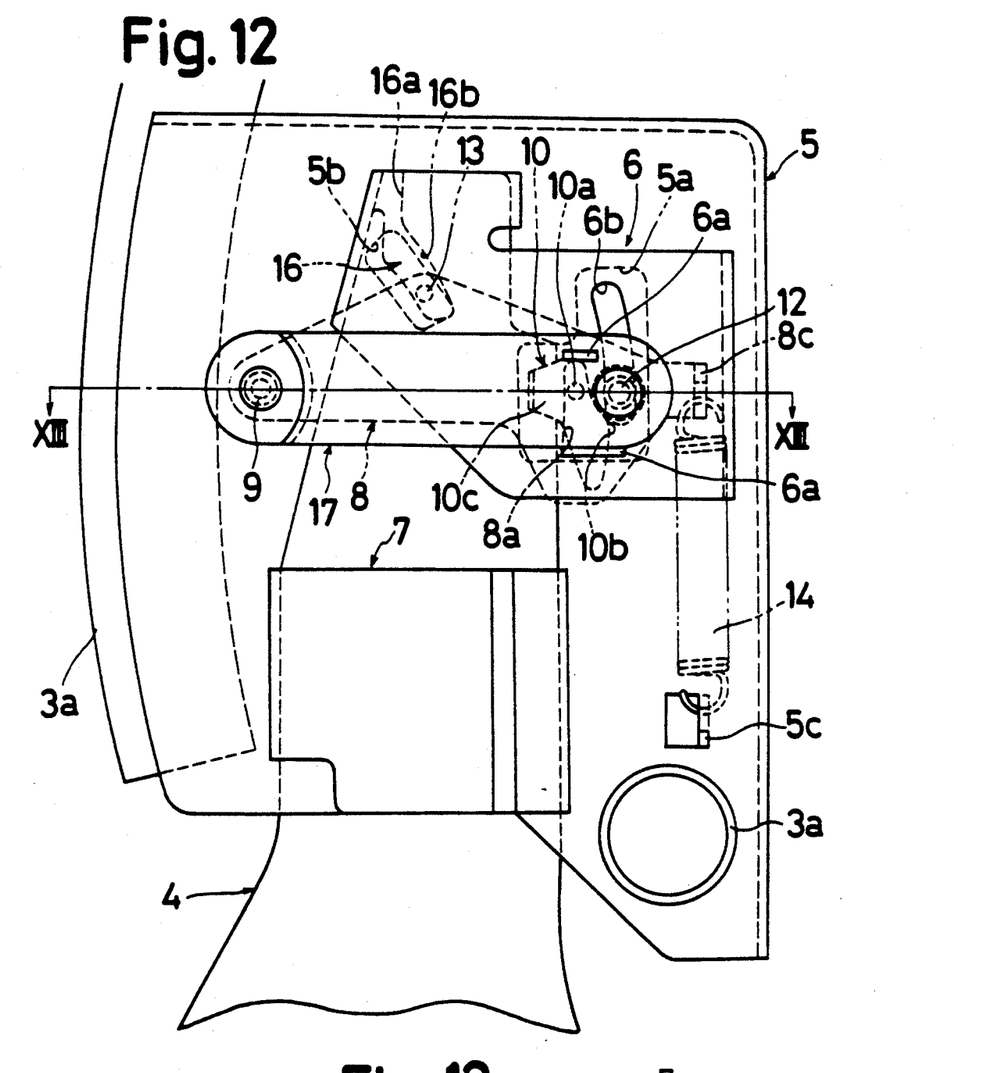
FIG. 12 is a view similar to FIG. 3A, showing another embodiment according to the present invention.
Figure 13:
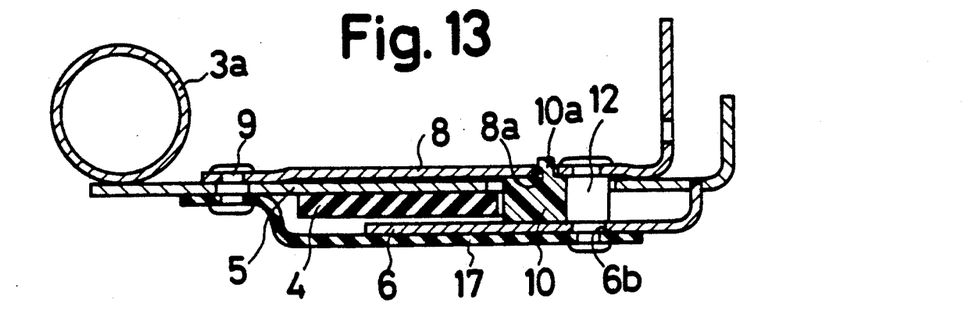
FIG. 13 is a cross-sectional view taken along the line XIII—XIII in FIG. 12.

As shown in FIGS. 12 and 13, it is possible to improve the rigidity of the lever 8 by adding sublever 17 to the lever 8 using the pins 9 and 12 by peening the ends of both pins against the sublever 17, the seatback bracket 5, and the guide member 6.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A vehicle seat having a seat cushion and a seatback, said seat comprising:

a seat cushion bracket having front and back edges and mounted on both sides of said seat cushion;

a seatback bracket having front and back edge portions and mounted on both sides of said seatback;

a lever pivoted on one of the front and back edge portions of said seatback bracket;

a cam member slidably supported on the other of the front and back edge portions of said seatback bracket and operatively engagable by said lever;

a locking recessed formed on the one of the front and back edges of said seat cushion bracket corresponding to the other of the front and back edge portions of said seatback bracket and engagable by said cam member; and biasing means operative between said seatback bracket and said lever to urge said lever in a direction to retain said cam member in fixing engagement with said locking recess.

2. A seat for vehicles as set forth in claim 1 further comprising guide means on said seatback bracket for receiving said seat cushion bracket.

3. A seat for vehicles as set forth in claim 1, wherein said cam member is provided with a projection, a ramp surface, and a bolt portion.

4. A vehicle seat having a seat cushion and a seatback, said seat comprising:

a seat cushion bracket mounted on both sides of said seat cushion;

a seatback bracket mounted on both sides of said seatback;

a lever pivoted on said seatback bracket;

a cam member slidably supported on said seatback bracket and operatively engagable by said lever, said cam member having a projection, a ramp surface, and a bolt portion;

a locking recess formed on said seat cushion bracket and engagable by said cam member; and biasing means operative between said seatback bracket and said lever to urge said lever in a direction to retain said cam member in fixing engagement with said locking recess;

said lever being provided with an elongated hole having an edge engaged by said projection of said cam member.

5. A seat for vehicles as set forth in claim 4, further comprising a follower pin on said lever for engaging said ramp surface of said cam member.

6. A seat for vehicles as set forth in claim 5, wherein said locking recess is fixedly connectable with said bolt portion of said cam member.

7. A vehicle seat having a seat cushion and a seatback, said seat comprising:

a seat cushion bracket mounted on both sides of said seat cushion;

a seatback bracket mounted on both sides of said seatback;

a lever pivoted on said seatback bracket;

a cam member slidably supported on said seatback bracket and operatively engageable by said lever;

a locking recess formed on said seat cushion bracket and engageable by said cam member;

biasing means operative between said seatback bracket and said lever to urge said lever in a direction to retain said cam member in fixing engagement with said locking recess; and guide means on said seatback bracket for receiving said seat cushion bracket, said guide means including a projecting portion for guiding said cam member in movement generally normal to the direction said cushion bracket is received by said seatback bracket.

8. A vehicle seat having a seat cushion and a seatback, said seat comprising:

a seat cushion bracket mounted on both sides of said seat cushion;

a seatback bracket mounted on both sides of said seatback;

a lever pivoted on said seatback bracket;

a cam member slidably supported on said seatback bracket and operatively engageable by said lever;

a locking recess formed on said seat cushion bracket and engageable by said cam member;

biasing means operative between said seatback bracket and said lever to urge said lever in a direction to retain said cam member in fixing engagement with said locking recess; and guide means on said seatback bracket for receiving said seat cushion bracket;

said lever including a lifting pin, said seat cushion bracket having a top edge for engaging said lifting pin and a groove for receiving said lifting pin upon full assembly of said brackets.

9. A vehicle seat having a seat cushion and a seatback, said seat comprising:

a seat cushion bracket mounted on each side of said seat cushion and having a locking recess opening at one edge thereof;

a seatback bracket mounted on each side of said seatback and including spaced guide means for receiving said seat cushion bracket;

a lever supported at one end by a pivot pin from said seatback bracket;

a follower pin carried by said lever to be spaced from and parallel to said pivot pin, said follower pin extending across said spaced guide means;

a cam member slidably supported on said seatback bracket for movement in a direction generally parallel to the opening direction of said locking recess, said cam member having a bolt portion on one side thereof to engage said locking recess and a ramp surface opposite from said one side and positionable to be engaged by said follower pin upon swinging movement of said lever; and biasing means operative between said seatback bracket and said lever to urge said lever in a direction to retain said cam member in said locking recess by wedging action of said follower pin and said ramp surface.

* * * * *